(12) United States Patent
Yi et al.

(10) Patent No.: US 8,359,832 B2
(45) Date of Patent: Jan. 29, 2013

(54) SCR REDUCTANT MIXER

(75) Inventors: Yong Yi, Dunlap, IL (US); Jinhui Sun, Bloomington, IL (US)

(73) Assignee: Caterpillar Inc., Peoria, IL (US)

( * ) Notice: Subject to any disclaimer, the term of this patent is extended or adjusted under 35 U.S.C. 154(b) by 512 days.

(21) Appl. No.: 12/642,932

(22) Filed: Dec. 21, 2009

(65) Prior Publication Data

US 2011/0146254 A1  Jun. 23, 2011

(51) Int. Cl.
*F01N 3/00* (2006.01)
(52) U.S. Cl. ............... 60/286; 60/295; 60/301; 60/303; 60/324; 422/172; 422/182; 422/183
(58) Field of Classification Search .............. 60/274, 60/286, 295, 297, 301, 303, 324; 422/170, 422/171, 172, 182, 183
See application file for complete search history.

(56) References Cited

U.S. PATENT DOCUMENTS

| | | | |
|---|---|---|---|
| 3,966,443 A | | 6/1976 | Okano et al. |
| 5,486,336 A | * | 1/1996 | Dalla Betta et al. ............ 422/90 |
| 6,021,639 A | * | 2/2000 | Abe et al. ........................ 60/297 |
| 6,516,610 B2 | | 2/2003 | Hodgson |
| 6,534,022 B1 | * | 3/2003 | Carlborg et al. ............. 422/180 |
| 7,059,118 B2 | | 6/2006 | Ripper et al. |
| 7,152,396 B2 | * | 12/2006 | Cheng ............................. 60/286 |
| 7,448,206 B2 | | 11/2008 | Meingast et al. |
| 7,481,042 B2 | | 1/2009 | Mahr |
| 7,490,467 B2 | * | 2/2009 | Cummings ..................... 60/324 |
| 7,533,520 B2 | | 5/2009 | Cheng et al. |
| 7,581,387 B2 | | 9/2009 | Bui et al. |
| 7,992,379 B2 | * | 8/2011 | Suzuki et al. .................. 60/286 |
| 2006/0245296 A1 | | 11/2006 | Nishioka et al. |
| 2007/0204751 A1 | | 9/2007 | Wirth et al. |
| 2007/0274877 A1 | | 11/2007 | Bush et al. |
| 2008/0184700 A1 | | 8/2008 | Harrer |
| 2008/0250776 A1 | | 10/2008 | Brown et al. |
| 2008/0267780 A1 | | 10/2008 | Wirth |
| 2008/0295497 A1 | | 12/2008 | Kornherr et al. |
| 2008/0308083 A1 | | 12/2008 | Wirth et al. |
| 2009/0019843 A1 | | 1/2009 | Levin et al. |
| 2009/0274601 A1 | | 11/2009 | Kwan et al. |
| 2010/0212301 A1 | * | 8/2010 | De Rudder et al. ............ 60/299 |

FOREIGN PATENT DOCUMENTS

| | | |
|---|---|---|
| DE | 102007052262 | 5/2009 |
| EP | 0247965 | 12/1987 |
| EP | 0864732 | 2/2003 |
| EP | 0894523 | 10/2003 |
| EP | 1514591 | 3/2005 |
| EP | 1712751 | 10/2006 |
| EP | 1712753 | 10/2006 |
| EP | 1982756 | 10/2008 |
| EP | 2098697 | 9/2009 |
| EP | 2111916 | 10/2009 |
| FR | 2900439 | 11/2007 |
| JP | 2008144644 | 6/2008 |
| KR | 836416 | 6/2008 |
| KR | 844750 | 7/2008 |
| WO | 2009085641 | 7/2009 |

* cited by examiner

*Primary Examiner* — Binh Q Tran
(74) *Attorney, Agent, or Firm* — Jeffrey A. Ruppel

(57) ABSTRACT

An engine exhaust aftertreatment system including a mixer disposed in the exhaust stream. The mixer includes a mesh section having a mesh of wires and may include a baffle section having a deflector that redirects a direction of flow of the exhaust stream. The mesh section may not extend across an entire width of an exhaust conduit containing the exhaust stream. The mesh section may also be sized and located to intersect the reductant introduced by the injector.

18 Claims, 5 Drawing Sheets

SCR REDUCTANT MIXER

TECHNICAL FIELD

The present disclosure relates to engine exhaust aftertreatment systems, and more particularly to exhaust aftertreatment systems employing reductants for NOx reduction technologies.

BACKGROUND

A selective catalytic reduction (SCR) system may be included in an exhaust treatment or aftertreatment system for a power system to remove or reduce nitrous oxide (NOx or NO) emissions coming from the exhaust of an engine. SCR systems use reductants, such as urea, that are introduced into the exhaust stream.

United States Patent Application Publication US 2007/0204751 discloses one embodiment of a baffle type mixer used in SCR systems. PCT Patent Application Publication WO 2009/085641 discloses one embodiment of a mesh type wire mixer used in SCR systems.

SUMMARY

In one aspect, the present disclosure provides an engine exhaust aftertreatment system including an injector configured to introduce a reductant into an exhaust stream of an engine. A mixer is disposed in the exhaust stream. The mixer includes a baffle section having a deflector that redirects a direction of flow of the exhaust stream and a mesh section having a mesh of wires. In another aspect, the mesh section does not extend across an entire width of an exhaust conduit containing the exhaust stream. In yet another aspect, the mesh section is sized and located to intersect the reductant introduced by the injector.

Other features and aspects of this disclosure will be apparent from the following description and the accompanying drawings.

DETAILED DESCRIPTION

Figure 1:
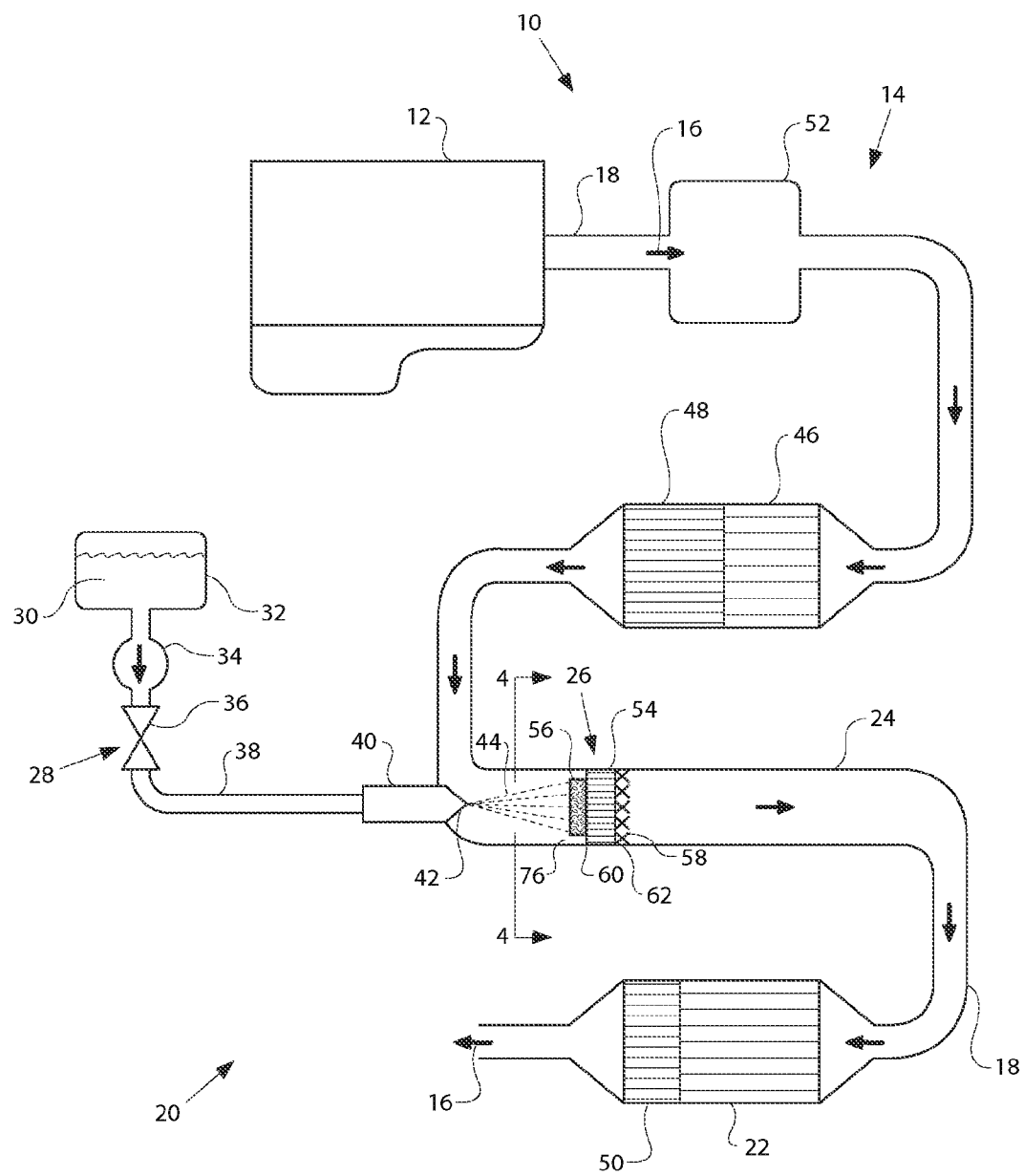
FIG. 1 is a diagrammatic view of a power system including an engine and an aftertreatment system.

As seen in FIG. 1, a power system 10 includes an engine 12 and an aftertreatment system 14 to treat an exhaust stream 16 produced by the engine 12. The engine 12 may include other features not shown, such as controllers, fuel systems, air systems, cooling systems, peripheries, drivetrain components, turbochargers, exhaust gas recirculation systems, etc.

The engine 12 may be any type of engine (internal combustion, gas, diesel, gaseous fuel, natural gas, propane, etc.), may be of any size, with any number of cylinders, and in any configuration ("V," in-line, radial, etc.). The engine 12 may be used to power any machine or other device, including on-highway trucks or vehicles, off-highway trucks or machines, earth moving equipment, generators, aerospace applications, locomotive applications, marine applications, pumps, stationary equipment, or other engine powered applications.

The aftertreatment system 14 includes an exhaust conduit 18 and a Selective Catalytic Reduction (SCR) system 20. The SCR system 20 includes an SCR catalyst 22, reductant introduction section 24, mixer 26, and reductant supply system 28.

The SCR catalyst 22 includes a catalyst material disposed on a substrate. The substrate may consist of cordierite, silicon carbide, other ceramic, or metal. The substrate may include a plurality of through going channels and may form a honeycomb structure.

The reductant supply system 28 may include a reductant 30, reductant source 32, pump 34, valve 36, reductant line 38, and injector 40. The reductant 30 is drawn from the reductant source 32 via the pump 34 and delivery to the injector 40 is controlled via the valve 36. The flow of reductant 30 may also be controlled by operation of the pump 34. The reductant introduction section 24 is the section of the exhaust conduit 18 where the reductant 30 is introduced.

The reductant supply system 28 may also include a thermal management system to thaw frozen reductant 30, prevent reductant 30 from freezing, or preventing reductant 30 from overheating. Components of the reductant supply system 28 may also be insulated to prevent overheating of the reductant 30. The reductant supply system 28 may also include an air assist system for introducing compressed air to aid in the formation of small droplets in the reductant spray 44. The air assist system may also be used to purge the reductant lines 38 and other reductant supply system 28 components of reductant 30 when not in use.

The reductant 30 comes from a nozzle or injector tip 42 of the injector 40 to form a reductant spray 44 or is otherwise introduced into the exhaust stream 16 or SCR catalyst 22. The position of the injection tip 42 may be such to direct the reductant spray 44 directly down a centerline of the reductant introduction section 24 and may intersect the center of the mixer 26.

The aftertreatment system 14 may also include a diesel oxidation catalyst (DOC) 46, a diesel particulate filter (DPF) 48, and a clean up catalyst 50. The DOC 46 and DPF 48 may be in the same canister, as shown, or separate. The SCR catalyst 22 and clean up catalyst 50 may also be in the same canister, as shown, or separate.

The aftertreatment system 14 is configured to remove or convert undesired constituents from the exhaust stream 16. The DOC 46 oxidizes NOx into Nitrogen dioxide (NO2). The DPF 48 collects particulate matter or soot. The SCR catalyst 22 is configured to reduce an amount of NOx in the exhaust stream 16 in the presence of the reductant 30.

A heat source 52 may also be included to remove the soot from the DPF 48, thermally manage the SCR catalyst 22, DOC 46, or clean up catalyst 50, to remove sulfur from the SCR catalyst 22, or to remove deposits of reductant 30 that may have formed. The heat source 52 may embody a burner, hydrocarbon dosing system to create an exothermic reaction on the DOC 46, electric heating element, microwave device, or other heat source. The heat source 52 may also embody operating the engine 12 under conditions to generate elevated exhaust stream 16 temperatures. The heat source 52 may also embody a backpressure valve or another restriction in the exhaust to cause elevated exhaust stream 16 temperatures.

In the illustrated embodiment, the exhaust stream 16 exits the engine 12, passes by or through the heat source 52, passes through the DOC 46, DPF 48, then passes through the SCR system 20, and then passes through the clean up catalyst 50 via the exhaust conduit 18.

Other exhaust treatment devices may also be located upstream, downstream, or within the SCR system 20. In the illustrated embodiment, the SCR system 20 is downstream of the DPF 48 and the DOC 46 is upstream of the DPF 48. The heat source 52 is upstream of the DOC 46. The clean-up catalyst 50 is downstream of the SCR system 20. In other embodiments, these devices may be arranged in a wide variety of orders and may be combined together. In one embodiment, the SCR catalyst 22 may be combined with the DPF 48 with the catalyst material deposited on the DPF 48.

While other reductants 30 are possible, urea is the most common source of reductant 30. Urea reductant 30 decomposes or hydrolyzes into ammonia (NH3) and is then adsorbed or otherwise stored in the SCR catalyst 22. The reductant introduction section 24 may be long to aid in the mixing or even distribution of the reductant 30 into the exhaust stream 16 and provide dwell time for the urea reductant 30 to convert into NH3. The NH3 is consumed in the SCR Catalyst 22 through a reduction of NOx into Nitrogen gas (N2).

The clean-up catalyst 50 may embody an ammonia oxidation catalyst (AMOX). The clean-up catalyst 50 is configured to capture, store, oxidize, reduce, and/or convert NH3 that may slip past or breakthrough the SCR catalyst 22. The clean-up catalyst 50 may also be configured to capture, store, oxidize, reduce, and/or convert other constituents present.

Control and sensor systems may also be included to control the engine 12, heat source 52, reductant supply system 28, and other components in the power system 10 or its application.

The mixer 26 includes a baffle section 54 and a mesh section 56. The baffle section 54 includes deflectors 58 that direct the exhaust stream 16 to create turbulence and mix the reductant spray 44 evenly in the exhaust stream 16. The deflectors 58 have a width 57 that is intersected by the flow path of the exhaust stream 16 so that the exhaust stream 16 is accordingly redirected. Accordingly, the deflectors 58 are disposed at an angle to the flow path of the exhaust stream 16. This angle may be less than 90 degrees and may be between 20 and 80 degrees. The deflector's 58 width 57 is greater than a thickness 59 to efficiently redirect the exhaust stream 16 from its current path without creating excessive backpressure.

In the current illustrated embodiment, the baffle section 54 has an upstream baffle end 60 and a downstream baffle end 62. The baffle section 54 may be shaped and sized to fit from wall to wall of the reductant introduction section 24.

Figure 2:
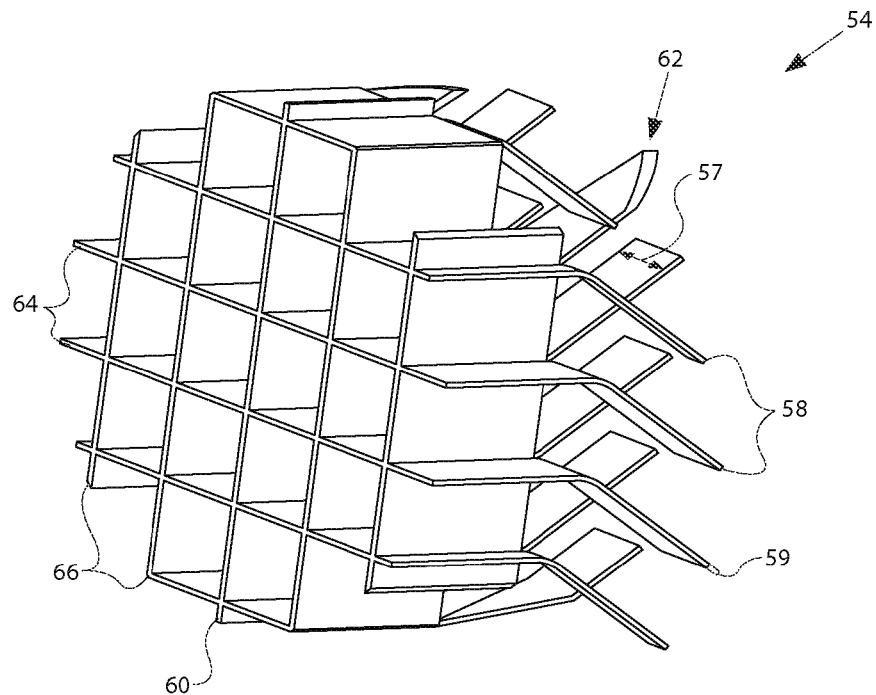
FIG. 2 is a perspective view of a baffle section.

Seen best in FIG. 2, the baffle section 54 includes rows of first members 64 and second members 66 that extend in the direction of flow of the exhaust stream 16. The first and second members 64 and 66 may cross hatch or crisscross or intersect at the upstream end 60. The intersecting first and second members 64 and 66 define open baffle spaces 68 there between, as seen best in FIG. 4.

The first members 64 may extend further towards the downstream end 62 and be bent at the downstream end 62 to form the defectors 58. The deflectors 58 may be formed, as shown, by alternating rows of first members 64 in opposing directions, thereby redirecting the exhaust stream 16 in a deliberate manner. The second member 66 may extend across the reductant introduction section 24 to support the first members 64.

In other embodiments, some or all of one or both of the first and second members 64 and 66 may extend towards the downstream end to form deflectors 58. The first or second members 64 or 66 may be bent or formed in a wide variety of ways and patterns to form the deflectors 58. In some embodiments, the deflectors 58 may be shaped as scoops or have any other of a variety of shapes. In other embodiments, the baffle section 54 may also not be large enough to fit from wall to wall of the reductant introduction section 24.

Figure 3:
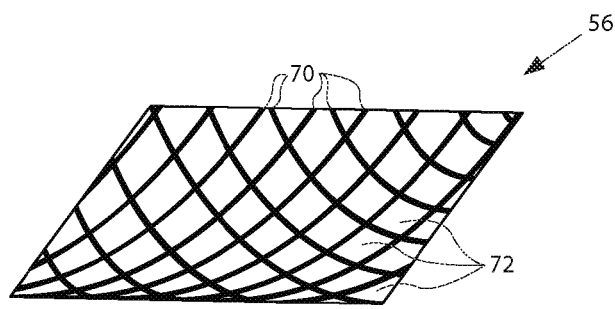
FIG. 3 is a magnified view of a mesh section.

FIG. 3 shows a magnified view of a portion of the mesh section 56. The mesh section 56 is made from a mesh or knit of interwoven wires 70. Because of this mesh, the exhaust stream 16 is scattered and not redirected in a deliberate manner as compared to the baffle section 54. The wires 70 of the mesh section 56 may be may be more than 5 times, 10 times, 50 times, or even 100 times smaller in cross-sectional area perpendicular to their length than one or both of the first and second members 64 and 66. The wires 70 may have a circular or any other cross-section.

The intersecting wires define open mesh spaces 72 there between. The cross-sectional area of the open mesh spaces 72 perpendicular to the entering direction of flow of the exhaust stream 16 into the mixer 26 may be more than 5 times, 10 times, 50 times, or even 100 times smaller than the cross-sectional area of the open baffle section spaces 68 perpendicular to the entering direction of flow of the exhaust stream 16 into the mixer 26. As seen best in FIG. 4, the mesh section may be constructed from concentric sections 74 of mesh to form the size needed.

Figure 4:
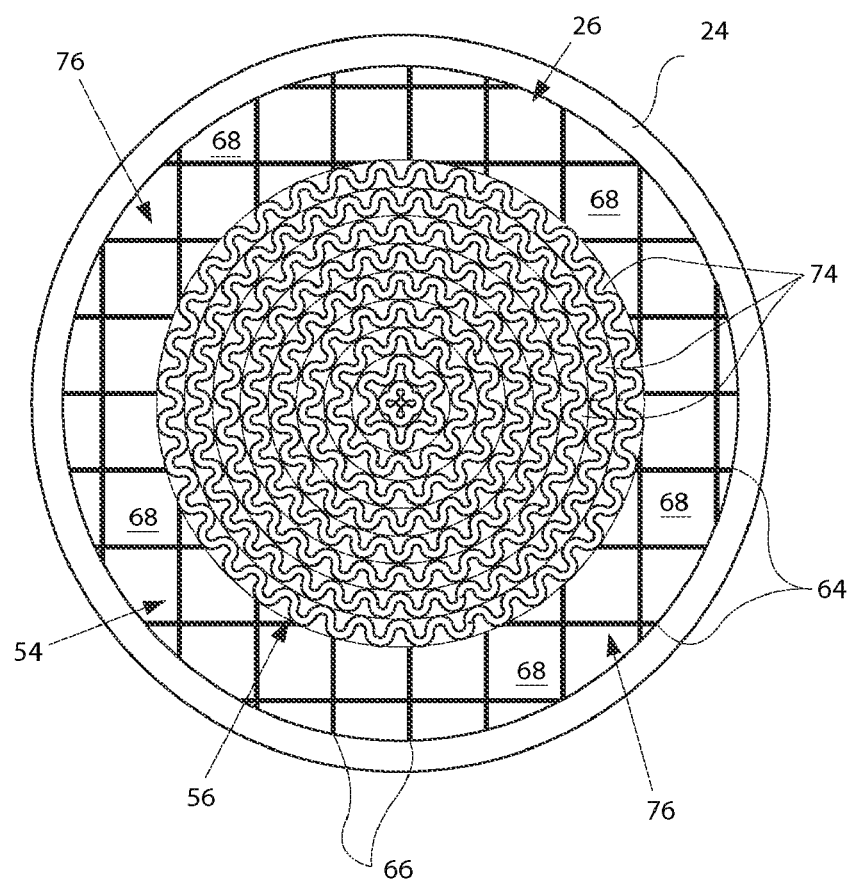
FIG. 4 is a front view of a mixer including both the baffle section and mesh section.
Figure 5:
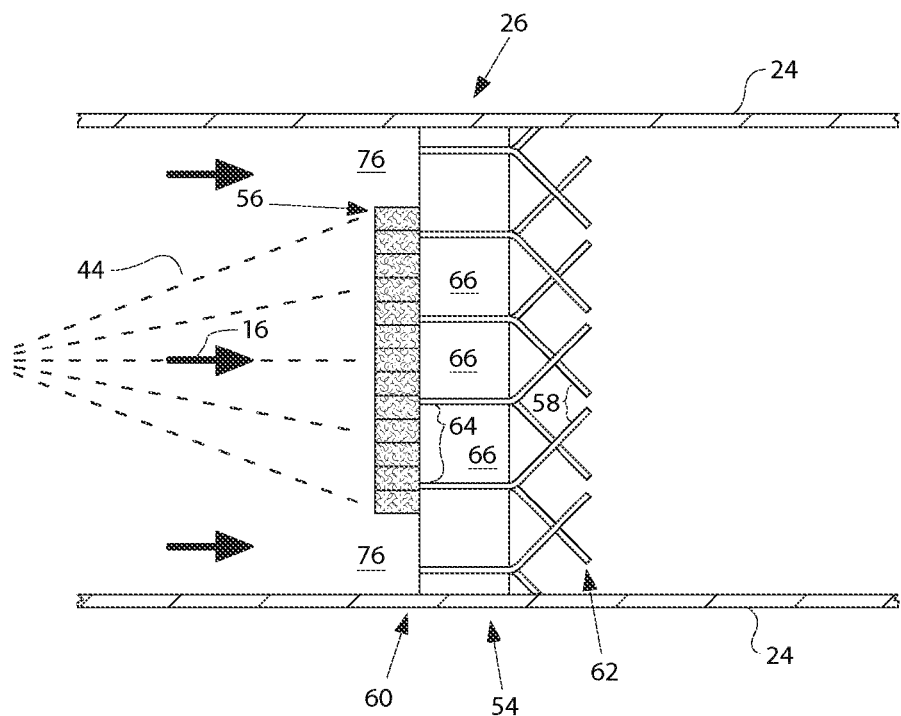
FIG. 5 is a side view of the mixer.
Figure 6:
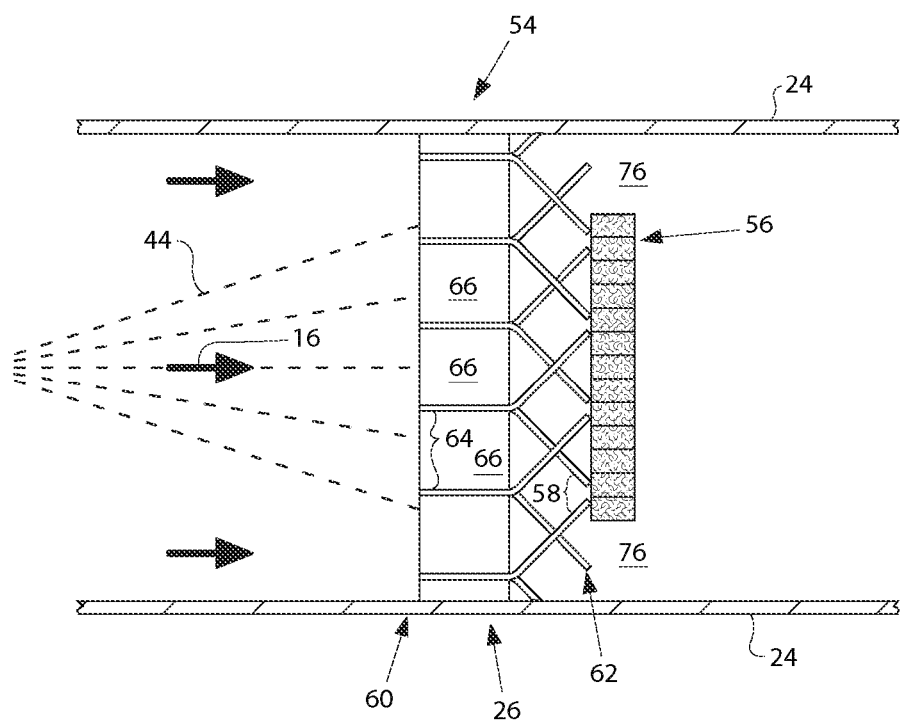
FIG. 6 is a side view of another embodiment of the mixer.

FIGS. 4-6 show that the mesh section 56 may have a cross-sectional area perpendicular to the entering direction of flow of the exhaust stream 16 into the mixer 26 that is smaller than the cross-sectional area perpendicular to the entering direction of flow of the exhaust stream 16 of the reductant introduction section 24. Likewise, the mesh section 56 may also have a cross-sectional area perpendicular to the entering direction of flow of the exhaust stream 16 into the mixer 26 that is smaller than the baffle section 54 cross-sectional area perpendicular to the entering direction of flow of the exhaust stream 16 into the mixer 26. This difference in size between the baffle section 54 and mesh section 56 defines flow-by areas 76 between the mesh section 56 and the walls of the reductant introduction section 24. When passing through the flow-by areas 76, the exhaust stream 16 does not pass through or avoids the mesh section 56.

Seen best in FIG. 4, the cross-sectional shape perpendicular to the direction of flow of the exhaust stream 16 of the reductant introduction section 24, baffle section 54, and mesh section 56 are circular. As illustrated, the inner diameter of the reductant introduction section 24 is roughly the same as the outer diameter of the baffle section 54 and the outer diameter of the mesh section 56 is smaller. In other embodiments, the cross sectional shapes of the reductant introduction section 24, baffle section 54, and mesh section 56 may not be circular and they may each have different shapes.

As seen best in FIGS. 5 and 6 the location of the mesh section 56 may be aligned and centered with the reductant spray 44. Accordingly, in embodiments where the reductant spray 44 is aligned with the center of the mixer 26 and centerline of the reductant introduction section 24, the mesh section 56 will also be centered with the baffle section 54 with the flow-by areas 76 surrounding the mesh section 56. The size of the mesh section 56 and distance from the injector tip 42 may be configured so the cross-sectional area of the mesh section 56 is approximately the same as the reductant spray 44 as it expands from the injector tip 42.

The mesh section 56 may be supported on members extending into the reductant introduction section 24. While the baffle section 54 and mesh section 56 may be separate, FIGS. 5 and 6 show that the mesh section 56 may be supported directly on the baffle section 54, with the mesh section 56 supported on one or both of the first and second members 64 and 66. In this way, the mesh section 56 can be located and supported without the addition of extra structures. The mesh section 56 may be connected to the baffle section 54 via clamps, hooks, clips, wire ties, bonding, welding, high temperature adhesives, interference fitting, or any other of a wide variety of methods. A recessed pocket could also be formed in the baffle section 54 to locate the mesh section 56.

Figure 7:
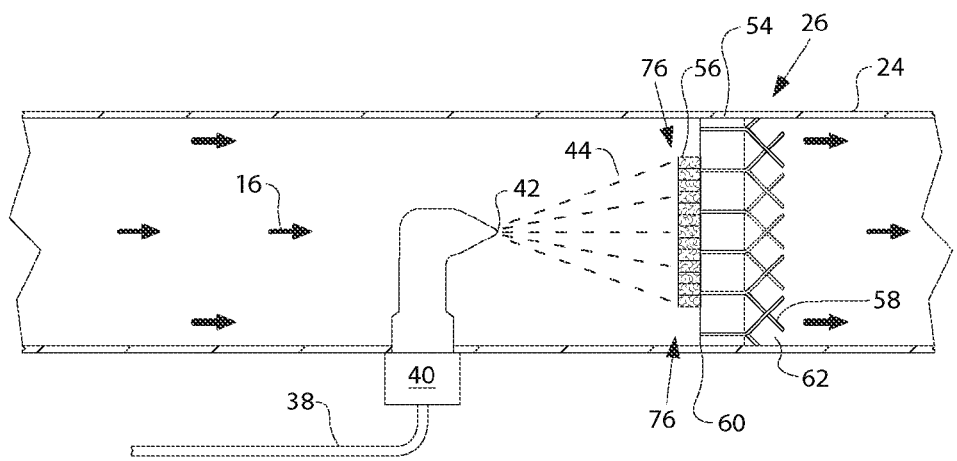
FIG. 7 is a side view of another embodiment of the mixer.

As illustrated in FIG. 6, the mesh section 56 may be upstream or down stream from the baffle section 54. FIG. 7 shows an alternative location of the injector 40. Instead of being located in a bend, the injector 40 extends into the reductant introduction section 24 and the reductant spray 44 is directly in front of the mixer 26.

Figure 8:
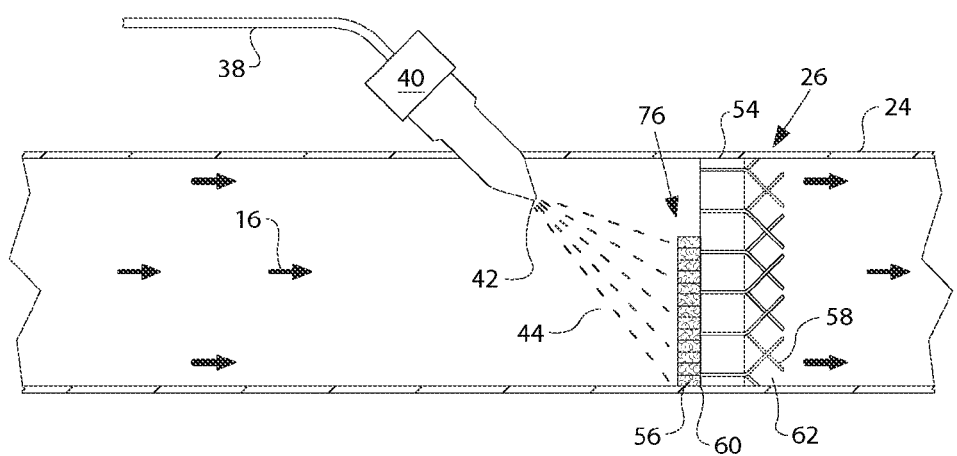
FIG. 8 is a side view of another embodiment of the mixer.

FIG. 8 shows another alternative position of the injector 40 with the reductant spray 44 disposed at an angle to the mixer 26 and the exhaust flow 16. Because of the angle of the injector 40, the reductant spray 44 does not intersect the mixer 26 in the center. Therefore, the mesh section 56 may be off-center. Accordingly, the flow-by area 76 is or biased or positioned to one side of the mixer 26.

The mixer 26 components may be constructed from steel or any other of a wide variety of materials. The mixer 26 may also be coated with materials to assist in the conversion or hydrolysis of the reductant 30 into NH3.

INDUSTRIAL APPLICABILITY

The mixer 26 assists in evenly distributing or mixing the reductant 30 into the exhaust stream 16, promoting the conversion of the reductant 30 into NH3, and preventing the formation of deposits. The mixer 26 should also be cheap, small, and create minimal backpressure. These features, however, are often in conflict with one another. For instance, large and complex structures may be effective at evenly distributing the reductant 30 into the exhaust stream 16 and promoting the conversion of the reductant 30 into NH3 but are not cheap, take up too much space, and often create a large amount of backpressure.

Evenly distributing the reductant 30 into the exhaust stream 16 improves the efficiency of the SCR system 20 by evenly introducing NH3 to all channels of the SCR catalyst and therefore the maximum amount of conversion can occur. Evenly distributing the reductant 30 into the exhaust stream 16 may also reduce the amount of reductant 30 that is needed to achieve that maximum efficiency. Evenly distributing the reductant 30 into the exhaust stream 16 may also prevent introducing too much NH3 to some areas of the SCR catalyst that may cause NH3 slip.

Promoting the conversion of the reductant 30 into NH3 is achieved by atomizing or breaking up the reductant spray 44 into smaller droplets. Smaller droplets encourage the evaporation of the water content in the reductant 30 and quickens the conversion into NH3.

Deposits may form when the reductant 30 is not quickly decomposed into NH3 and thick layers of reductant 30 collect. These layers may build as more and more reductant 30 is sprayed or collected, which may have a cooling effect that prevents decomposition into NH3. As a result, the reductant 30 sublimates into crystals or otherwise transforms into a solid composition to form the deposit. The deposit composition may consist of biuret (NH2CONHCONH2) or cyanuric acid ((NHCO)3) or another composition depending on temperatures and other conditions. These deposits may form in areas where the reductant spray 44 impinges or settles, such as on the exhaust conduit 18 walls or on the mixer 26.

These deposits may have negative impacts on the operation of the power system 10. The deposits may block flow of the exhaust stream 16, causing higher backpressure and reducing engine 12 and aftertreatment system 14 performance and efficiency. The deposits may also disrupt the flow and mixing of the reductant 30 into the exhaust stream 16, thereby reducing the decomposition into NH3 and reducing NOx reduction efficiency. The deposits may also block the injector tip 42 or disrupt the reductant spray 44. The formation of the deposits also consumes reductant 30, making control of injection harder and potentially reducing NOx reduction efficiency. The deposits may also corrode and degrade components of the SCR system 20. The deposits may also block channels of the SCR catalyst 22, again reducing NOx reduction efficiency.

Limiting backpressure increases is also important. High backpressure can harm engine performance. High backpressure may also lead to deposit formation and exhaust leaks.

Using the baffle section 54 in conjuncture with the mesh section 56 generates a number of synergistic effects. While both the baffle section 54 and mesh section 56 each do some degree of distribution and atomization, the baffle section 54 has been found to be more effective at evenly distributing the reductant 30 into the exhaust stream 16 and the mesh section 56 has been found to be more effective at atomizing the reductant 30. By using both the baffle section 54 and the mesh section 56 together, a greater degree of distribution in combination with atomization has been achieved in a shorter length than by using either of the baffle section 54 or the mesh section 56 alone.

Long mesh sections are known to create large amount of backpressure. By using both the baffle section 54 and the mesh section 56 together, the mesh section 56 can be shorter, minimizing the negative backpressure effect. Disposing the mesh section 56 on the baffle section 54 also provides structural support for the mesh section 56 that may be lacking, allowing the mesh section 56 to be less dense, which again limits the negative backpressure effect.

By using both the baffle section 54 and the mesh section 56 together, the mesh section 56 can also be smaller and only needs to be placed directly in front of the reductant spray 44. Accordingly, atomization of the reductant spray 44 can be achieved while allowing a portion of the exhaust stream 16 to pass through the flow-by areas 76, which again limits the negative backpressure effect. The flow-by areas 76 also provide a drain for reductant 30 that may otherwise collect, thereby preventing the formations of deposits.

While the mixer 26 is described above to aid in the introduction of a reductant into an exhaust stream, it is also contemplated that the mixer 26 could be used to aid in the introduction of any of a wide variety of substances in any of wide variety of flows. Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:
1. An engine exhaust aftertreatment system comprising:
   an injector configured to introduce a reductant into an exhaust stream of an engine; and
   a mixer disposed in the exhaust stream including:
      a baffle section having a deflector that redirects a direction of flow of the exhaust stream; and a mesh section having a mesh of wire, wherein the mesh section does not extend across an entire width of an exhaust conduit containing the mesh section in order to allow a flow-by area for a portion of the exhaust stream to circumvent the mesh section.

2. The engine exhaust aftertreatment system of claim 1 wherein the baffle section includes a plurality of deflectors.

3. The engine exhaust aftertreatment system of claim 1 wherein the deflector includes a first member extending in the direction of flow of the exhaust stream.

4. The engine exhaust aftertreatment system of claim 3 wherein the first member is supported by a second member extending across an exhaust conduit containing the exhaust stream.

5. The engine exhaust aftertreatment system of claim 1 wherein the mesh section is supported on a member extending into an exhaust conduit containing the exhaust stream.

6. The engine exhaust aftertreatment system of claim 1 wherein the mesh section is supported on the baffle section.

7. The engine exhaust aftertreatment system of claim 1 wherein the mesh section is sized and located to intersect the reductant introduced by the injector.

8. An engine exhaust aftertreatment system comprising:
   an injector configured to introduce a reductant into an exhaust stream of an engine; and
   a mixer disposed in the exhaust stream including a mesh section having a mesh of wires, wherein the mesh section does not extend across an entire width of an exhaust conduit containing the exhaust stream, thereby yielding a flow-by area wherein a portion of the exhaust stream circumvents the mesh section.

9. The engine exhaust aftertreatment system of claim 8 wherein the mesh section is supported on a member extending into an exhaust conduit containing the exhaust stream.

10. The engine exhaust aftertreatment system of claim 8 wherein the mixer further includes a baffle section having a deflector that redirects a direction of flow of the exhaust stream.

11. The engine exhaust aftertreatment system of claim 10 wherein the mesh section is supported on the baffle section.

12. The engine exhaust aftertreatment system of claim 10 wherein the mesh section is sized and located to intersect the reductant introduced by the injector.

13. An engine exhaust aftertreatment system comprising:
   an injector configured to introduce a reductant into an exhaust stream of an engine; and
   a mixer disposed in the exhaust stream including a mesh section having a mesh of wires, wherein the mesh section is sized and located to intersect the reductant introduced by the injector, and wherein the mesh section does not extend across an entire width of an exhaust conduit containing the mesh section in order to allow a flow-by area for a portion of the exhaust stream to circumvent the mesh section.

14. The engine exhaust aftertreatment system of claim 13 wherein the mesh section is supported on a member extending into an exhaust conduit containing the exhaust stream.

15. The engine exhaust aftertreatment system of claim 13 wherein the mixer further includes a baffle section having a deflector that redirects a direction of flow of the exhaust stream.

16. The engine exhaust aftertreatment system of claim 15 wherein the baffle section includes a plurality of deflectors.

17. The engine exhaust aftertreatment system of claim 15 wherein the deflector includes a first member extending in the direction of flow of the exhaust stream and the first member is supported by a second member extending across an exhaust conduit containing the exhaust stream.

18. The engine exhaust aftertreatment system of claim 15 wherein the mesh section is supported on the baffle section.

\* \* \* \* \*